United States Patent [19]
Fritze

[11] Patent Number: 5,133,453
[45] Date of Patent: Jul. 28, 1992

[54] SHIPPING CONTAINER FOR PREASSEMBLED MOTORCYCLES

[75] Inventor: Rainer Fritze, Berlin, Fed. Rep. of Germany

[73] Assignee: Clemens Fritze Industrieverpackunger, Berlin, Fed. Rep. of Germany

[21] Appl. No.: 654,660
[22] PCT Filed: May 30, 1990
[86] PCT No.: PCT/DE90/00421
  § 371 Date: Mar. 28, 1991
  § 102(e) Date: Mar. 28, 1991
[87] PCT Pub. No.: WO90/15002
  PCT Pub. Date: Dec. 13, 1990

[30] Foreign Application Priority Data
  Jun. 3, 1989 [DE] Fed. Rep. of Germany ..... 06968[U]
  Jun. 3, 1989 [DE] Fed. Rep. of Germany ....... 1101106

[51] Int. Cl.⁵ ............................................... B65D 85/68
[52] U.S. Cl. ..................................... 206/335; 206/386
[58] Field of Search ............... 206/335, 386; 294/67.1, 294/904

[56] References Cited
U.S. PATENT DOCUMENTS
3,393,935  7/1968  James .................................. 294/67.1
4,171,741  10/1979  Fish .................................. 206/386 X

FOREIGN PATENT DOCUMENTS
2241039  2/1974  Fed. Rep. of Germany ...... 206/335
825380  4/1981  U.S.S.R. ............................... 206/335
903254  2/1982  U.S.S.R. ............................... 206/335
982983  12/1982  U.S.S.R. ............................... 206/335

*Primary Examiner*—William I. Price
*Attorney, Agent, or Firm*—Wenderoth, Lind & Ponack

[57] ABSTRACT

A shipping container for preassembled motorcycles comprises a stepped grid-shaped support structure in the form of a frame-shaped base which resists the flexural forces acting on it when the motorcycle is lashed to the base. The motorcycle can be suitably attached lengthwise in a guide for the rear wheel, by a continuously adjustable wedge element mounted lengthwise on a rolling base on the center of the frame base. When the surface of the wedge is arranged opposite to the direction in which the motorcycle in to be introduced into the shipping container, the rear wedge element can be fitted into a recess on the frame-shaped base to form an entry and exit ramp for the motorcycle, which can be unloaded smoothly from the rolling base of the shipping container to the roadway, which is at a different height. The container is re-usable and can be readily assembled and dismantled. In a preferred embodiment, the frame-shaped base has a box-like casing formed by four detachable walls detachably secured to the base. The container has no other loose parts.

34 Claims, 9 Drawing Sheets

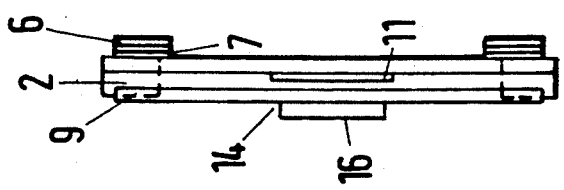
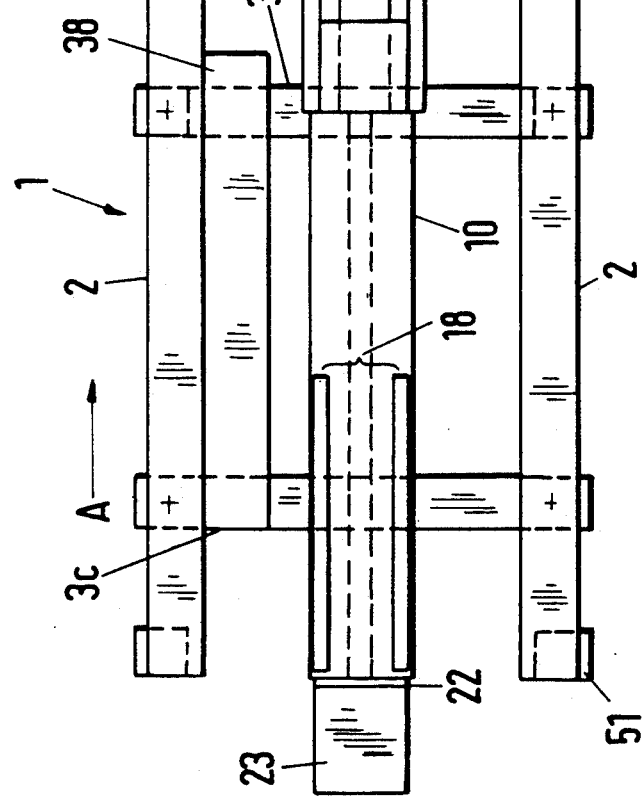
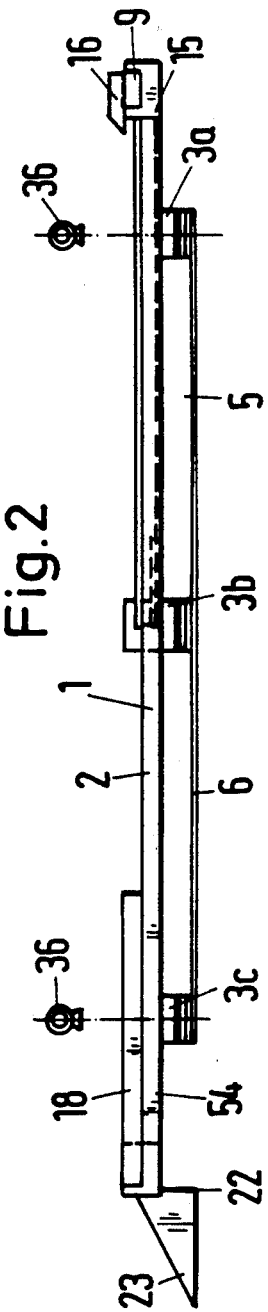
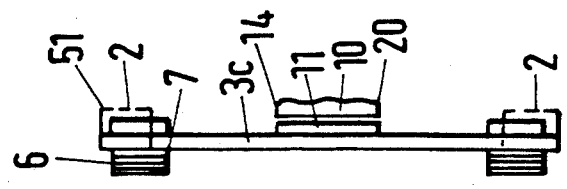

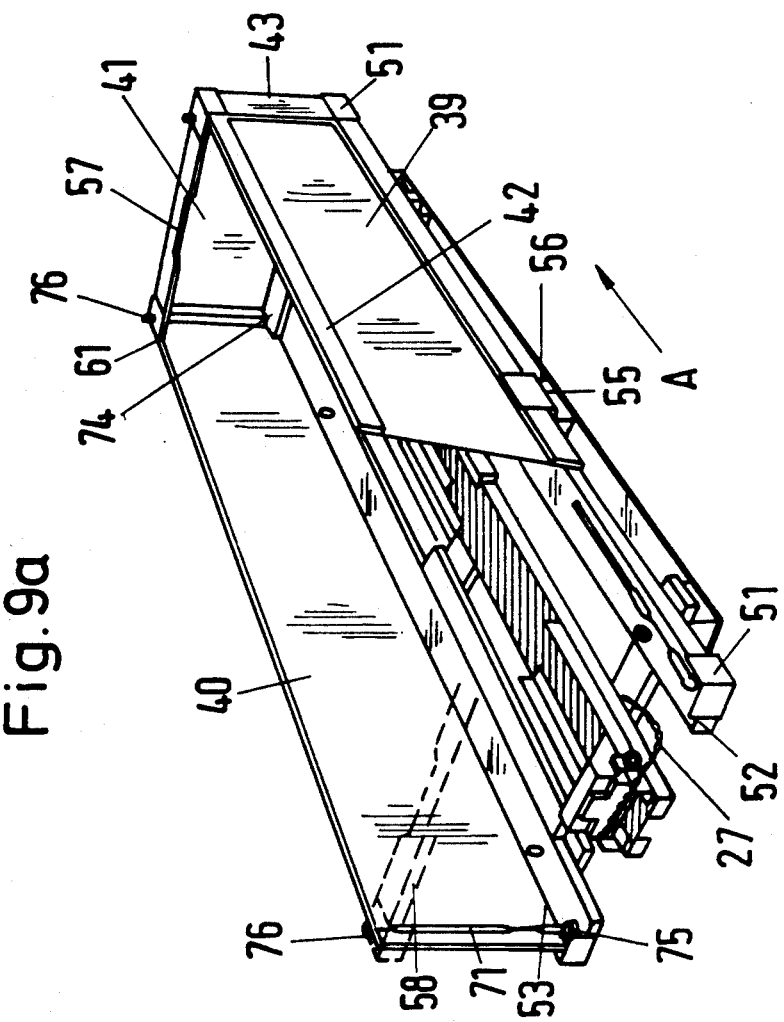
Fig.9a
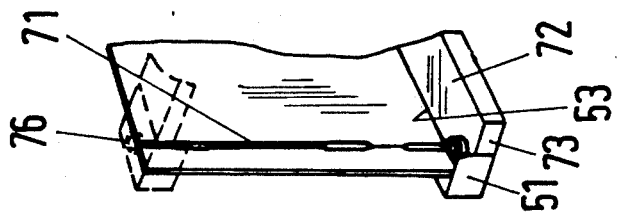
Fig.12
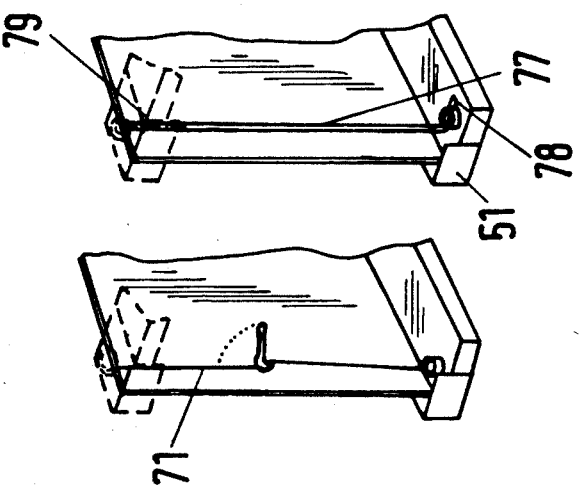
Fig.11
Fig.13

SHIPPING CONTAINER FOR PREASSEMBLED MOTORCYCLES

BACKGROUND OF THE INVENTION

The invention relates to a shipping container for preassembled motorcycles or the like, comprising a frame-shaped bottom panel, particularly made of wood, having two longitudinal runners secured to at least three stringers extending transversely thereto of which the first, second and third stringers, as seen in the direction in which the motorcycle is introduced into the container (i.e. the longitudinal direction), are fastened to front, center and rear portions, respectively, of said longitudinal runners, and guide means for laterally guiding the motorcycle front wheel. The guide means are secured along the longitudinal centerline of the bottom panel and extend rearwardly from the front end thereof. A stationary wedge element is disposed at the front end of the bottom panel above the lateral front wheel guide means and in a direction transverse thereto to form an abutment for the front wheel in the longitudinal direction. A guide means is provided for the rear wheel of said motorcycle and is disposed along the longitudinal centerline of the bottom panel at the rear portion thereof. Straps, engageable with the bottom panel, are provided for lashing the motorcycle thereto.

Fundamentally, the design of shipping containers for motorcycles not in a disassembled condition is a difficult task. Because of its shape, its weight (up to 500 kg) and its exterior configuration, a motorcycle cannot be placed on its side; it has to be secured in place and shipped in its shipping container in a vertical position.

Comprising body elements of thin sheet metal and plastic components, motorcycles are highly sensitive to shipping damage.

In the commercial export business, disassembled motorcycles are shipped in high-strength corrugated cardboard crates. Only few manufacturers ship their motorcycles in a partly disassembled or ready-to-use condition in disposable shipping containers, and only if major quantities of such motorcycles of the same type and having the same dimensions are to be shipped.

For securing a motorcycle in place, it is necessary, basically, to secure its front and rear wheels and to then tie it in place in angular (diagonal) directions using straps and/or to rigidly connect it in place with the cover and the walls of the top portion of the enclosing container.

A prior shipping container of the kind initially explained is used as a disposable container for partly disassembled or ready-to-use units of one model of the BMW line of motorcycles. This container is destroyed once the motorcycle has been unpacked at its destination. The prior shipping container has vertical grooves along the outer edges of the longitudinal grooves for guiding the lashing straps. A front wedge element acting as an abutment in the direction of motorcycle introduction is secured to a lateral front wheel guide means. A means for laterally guiding the rear wheel is secured to additional transversely extending stringers. As the motorcycle is being pushed into its container, a relatively high pushing force has to be used to get the motorcycle front wheel to move over the successive transverse stringers until it strikes the front wedge element.

If the motorcycle is very heavy, it is difficult for even several persons to succeed in pushing it into its container. For this reason, it is common practice in assembly-line packaging of motorcycles to use electric hoists that lower motorcycles into the frame. Alternatively, a hydraulic platform is used to jack the motorcycle up to the level of the top surfaces of the transversely extending bottom frame members in front of the bottom panel. At the same time, the lower-level spaces between the transversely extending frame portions are bridged by a hydraulically jackable panel mounted in the bottom of the motorcycle position so as to create a continuous plane on which the motorcycle can roll into the container. After the motorcycle has been rolled in, the bridge panel is dropped to lower the motorcycle to get its front and rear wheels to assume positions; these differ for each motorcycle model and are established by the positions of the transverse and longitudinal stringers on the container bottom panel.

Thereafter, the motorcycle can only be lapsed in place loosely and in a preliminary fashion since a final firm lashing will cause the bottom to curve out. In this curved form, the bottom is in no condition to be shipped or stored.

For this reason, and before the motorcycle is finally strapped to the bottom panel, side members of plywood or other wood materials are nailed to the longitudinal runners and to the front and rear transverse supporting members to lend sufficient support to the bottom panel.

Each motorcycle model requires the provision of a shipping container having a bottom structure and a size which closely corresponds to that model.

This kind of containment design is suited only of motorcycles of the same type, i.e. having the same dimensions, and only for great numbers of containers. It further requires the use of auxiliary equipment and of personnel skilled in its use. It is in no way re-usable.

However, international tourism has created a need for re-usable containers for ready-to-use motorcycles of any size, type and accessory configuration which obviate the necessity of disassembling the motorcycles for shipment.

For example, if a tourist wants to use his/her motorcycle for vacationing overseas, it should be possible to take the motorcycle back home once the vacation is over. The tourist is likely to travel by air, i.e. the motorcycle must be transported in the cargo hold of the same airplane the tourist travels on to his/her destination. The shipping container should be available when the tourist checks in to fly home.

Similar problems arise for ground or sea transport.

Airlines and travel organizers have failed so far to solve this containment problem and to provide safe motorcycle accommodations in the cargo holds of the transport vehicles tourists use.

In the past, a number of manufacturers have used disposable containers for specific types of motorcycles made in great numbers. These containers have been unsatisfactory in that:

1. the great variety of the dimensions of the motorcycles themselves and of the accessories motorcycles come with is forbidding; and 2. substantial expenses arise and continue to increase for container disposal at the destination, e.g. motorcycle dealers.

A shipping container should solve the following problems:

1. A safe and stable containment for all motorcycle types, sizes and weights, providing ample means of securing the motorcycle in place.

2. The containment should be re-usable
   a) for saving costs and for availability when the motorcycle has to be packaged for a tourist's return flight; or
   b) to obviate the necessity of a cost-intensive disposal of bulky one-way containers.
3. Simple introduction of the motorcycle into, and its removal from, the container without creating hazards or running the risk of damage.
4. The container should be easy to assemble and disassemble without being damaged and without requiring special equipment and tools.
5. Assembly and disassembly should be possible for unskilled persons even without detailed knowledge of how to proceed, and the container should consist of parts as few in number as possible.
6. No nuts, bolts or other fasteners should be free to separate and get lost after assembly or disassembly. Since shipping container frequently are transported to countries using different threaded fastener standards, a loss of container parts may create major problems.
7. In the disassembled and collapsed condition, the container should have a value as small as possible. It should be possible to stack a plurality of collapsed containers both for storage and for the return of containers not containing a motorcycle.
8. The shipping container should be usable as intended with or without side walls as required by the transport vehicle.
9. It should be possible to move the container on roller or ball tracks and by floor transport vehicles.
10. Stable and damage-free positioning and lashing of the container in the cargo hold of aircraft, in air or sea cargo containers or in other transport vehicles should be possible. In particular, space-saving accommodation and the observance of regulations requiring the use of the international standard IATA air cargo pallet for the bottom cargo holds of a wide variety of passenger aircraft should be ensured.

SUMMARY OF THE INVENTION

For these reasons, the object underlying the invention is to provide a shipping container of the type initially specified so that it satisfies all of the above requirements, as well as the functional relationships existing between them.

In accordance with the invention, this object is achieved by providing a base having a stepped configuration, and which resists flexing under the forces caused by the motorcycle being lashed in place, and which comprises an underframe. The underframe extends less than the full length of the base at each end thereof by a predetermined distance, and includes two longitudinally extending stringers vertically placed under the runners and connected to the transverse stringers of the base. A rolling floor is provided along the centerline of the base on said transverse stringers and has affixed thereto lateral guide structures for the front and rear wheels. A wedge element is affixed to the base by means of a movable fastening member and is adapted to be longitudinally slid into a guide structure provided for the rear wheel to the secure motorcycle in position. The wedge element is adapted to be secured in position by infinitely adjustable clamping means which engage the guide structure behind the rear wheel, with the ramp surface of the wedge element facing in the direction of motorcycle introduction onto the rolling floor and is adapted further to be fitted into a recess provided at the rear end surface of the base with the ramp surface facing in a direction opposite the direction of motorcycle introduction, in order to act as a motorcycle roll-in and roll-out ramp. Means are provided for making up for the difference in level between the top surface of the rolling floor and the resting plane of the underframe. Eye members are affixed to the base to receive straps for lashing the motorcycle in position.

The inventive shipping container enables the motorcycle to be secured in position in a longitudinal direction between the stationary front wedge element and the infinitely adjustable rear wedge element:
   a) without the necessity of pushing the heavy motorcycle over a positioning threshold as it is pushed into the container; and
   b) without loose bolts needing to be introduced at predetermined positions to fix the rear wheel in place.

The inventive shipping container ensures lateral fixing and guidance of the motorcycle in the front wheel area by the two longitudinally extending wood elements of the front guide structure and the wedge element in front of the front wheel, which abuts the front wheel. The rear wheel is laterally guided by two metal angle bar members forming the rear guide structure. For fixing the motorcycle in position in the longitudinal direction, the rear wedge element is placed between the metal angle bars with its infinitely adjustable clamping means clampingly engaging the metal angle bars to accommodate different wheel spacings of the motorcycles to be shipped.

The lateral wheel guiding means are secured on the rolling floor extending longitudinally through the base space so that the motorcycle can be rolled in and out easily along the rolling floor and over the wedge element which can be fit with the rear end face of the base to act as a roll-in or roll-out ramp. The rolling floor forms a safe surface for the motorcycle to stand on. The rolling floor may be lowered in the front wheel area so as to more effectively utilize the height of the shipping container—a point of importance since motorcycles have relatively high windshields and the stowing space and door heights in aircraft cargo holds are limited. The load is not received by a lower support structure as in the rear section of the rolling floor, but by the plywood element mounted on the lateral guide elements for the front wheel.

The underframe is connected at its four outer corners with the first and third stringers and with the longitudinal runners above by through-bolts. These four bolts are tightened on the top surface by means of nuts having annular eye structures affixed thereto.

At the same time, the four eye members may be used for lashing the motorcycle to the base and also for lashing the base in place in the cargo hold if no box-like enclosure is used—e.g. for short-haul transport or in special cases.

Preferably, the base has a board or plank for the motorcycle jack to rest on in its extended condition. This board is provided on the lefthand side (as seen in the direction of motorcycle introduction) of the centerline and attached to the second and third stringers.

This jack res board greatly facilitates the work preparatory to the actual lashing operation (wrapping straps around the motorcycle body, etc.) if only one person is available to do the job.

In order to ensure shipment of an undamaged motorcycle, the motorcycle has to be protected by an enclosure extending all around it to a height of at least 60 cm.

Conveniently, the side wall panels are plugged in tongue-and-groove fashion into means provided on the base and are held at the top thereof by corresponding holding means.

This box-like enclosure is secured (also against diagonal pulling forces) by vertically acting connecting rods having threaded portions or the like means at the top ends thereof to clamp the base together with the top holding means.

Eight sheet steel corner elements are provided to accept the vertical clamping forces (in three planes):

a. at the bottom four corners on the longitudinal runners; and b. at the top four corners on the transverse frame beams.

Advantageously, the transverse frame beams may be non-releasably affixed to the transversely extending wall panels of the box-like enclosure so that, as the longitudinally extending wall panels are assembled with the tranversely extending wall panels, the sheet steel corner elements at the ends of the transverse frame beams, which are secured on the inside surfaces of the transversely extending wall panels along the top edges thereof, may embrace the wall panels at the respective corners so that the sturdy metal noses provided in the corner elements lockingly engage associated grooves in the top edge of the respective longitudinally extending wall panels. By tightening the clamping assemblies associated with the sheet steel corner elements, the box-like enclosure may be firmly secured to and held on the base.

The four pairs of sheet steel corner elements are secured by the vertical pressure which the ring nuts or eye members threaded on the connecting rods exert against the top edges of the wall panels of the box-like enclosure and on the bottom surface of the base, thus creating an exceptionally firm and lashable connection of the base with the box-like enclosure placed on it.

At the same time, the ring structure of the four internally threaded elements at the top corners of the box-like enclosure permits the assembled container to be stably lashed in position in a cargo storage hold.

The following embodiments of the vertically acting clamping assemblies may be used:

1. A straight bar having a circular or flat cross section which is secured at its bottom end by a plate welded to it and has affixed at its top end a length of threaded rod adapted to accept an internally threaded clamping member. (Drawbacks: the bar cannot be tilted over and is in the way when the motorcycle is to be rolled up on the rolling floor.);

2. A clamping assembly comprising a clevis-type joint right above the base. This obviates the necessity of withdrawing the threaded rod and loosely placing it on the base when the container is disassembled (risk of loss).

A structure which is simpler and more economical than the aforesaid clevis-type assembly, is formed when the clevis-type joint is replaced by a nut welded to the end face of a threaded rod projecting a short length from the base. Before being finally fastened to the base, this nut threadingly receives an externally threaded rod angled at 90°. The vertical end of the threaded rod has a length such that it extends beyond the top sheet metal corner on the transverse beam and can receive a nut to be tightened thereon. After this movable threaded rod unit has been put in place and tightened, the rod, which has a substantial length, can no longer be removed. It may, however, be tilted down to a horizontal position.

In a solution having the same effect, a lug projects upwardly from the bottom runner, and a connecting rod has a bottom leg angled at 90° which is introduced in the opening of the lug. A plate is welded to the end of the leg (or similar means are used) so as to form a non-releasable but movable joint; or 3. The clamping means may comprise spring means or tightenable chain means connected between the top and bottom fixtures in a manner such that they cannot be separated. For ease of manipulation and avoidance of any risk of loss, the angled rod-type connection with a welded-on nut or a lug-type element affixed to the base is preferred. As a result, a box-like enclosure can be provided which is totally safe and stable and encloses the motorcycle to a height of approx. 70 cm above the base.

This being a light-weight design, lateral protection has been provided only to that height so as to save weight. The differences in height of the motorcycles can be disregarded.

A box-like enclosure having the aforesaid height enables the shipping containers to be placed side by side without running the risk of the motorcycles being damaged. It equally enables other kinds of cargo to be stowed beside the shipping container on an aircargo pallet or in a cargo storage hold.

Similarly and advantageously, the inventive shipping container may be provided with higher wall panels and a top cover so as to create a full enclosure. This embodiment will be heavier and more expensive, but enables the containers to be placed on top of each other to a stacking height of at least four units—a point of importance for transport by ship.

The inventive shipping container has been designed so that no loose bolts, nuts or other fastening or connecting elements can come free and be lost on disassembly since fasteners having metric threads may not be available at the destination.

The four top screw-on eye members are connected to the transverse frame beams by chains having sufficient lengths. The dual-function wedge element (for rolling the motorcycle in and out and securing it in place) is fastened to the base by a chain also of sufficient length. All other connecting or fastening elements are releasable (as they must be to fulfill their functions), but cannot be separated from the assembly.

In order to allow the shipping container to be easily assembled and disassembled even by unskilled persons, the inventive shipping container is designed:

1. to consist only of the base and the four plug-in wall panels—no other separate components exist; and 2. to ensure that only the aforesaid eye members are needed to secure the assembled components and the shiftable rear wheel retainer in position. These eye elements can be tightened without tools—apart from a rod-like object which may be introduced in the eye opening. No other threaded or clamping connections need to be made.

Internationally standardized air cargo pallets for bottom cargo holds (IATA PALLET-PI) have a length of 224 cm and lashing slots spaced approx. 214 cm. Given conventional motorcycle lengths, bases less than 232 cm long are not sufficient. Placing such a base on an aircraft cargo pallet 224 cm long is permissible in the longitudinal direction if the air carrier's lashing straps or nets can be fixed in the lashing slots (spaced 214 cm).

In this respect, the inventive shipping container has a stepped bottom structure with the underframe drawn in at each end to less than 214 cm. This ensure good floor clearance for lashing nets. The underframe has a structural height of at least 6 cm so that lashing straps or nets may be hung up under the longer top frame for securing the assembly on standardized (plate) pallets. At the same time, lateral openings in the underframe facilitate the introduction of floor conveying equipment.

The frame-like structure has a very light weight (weight savings for air transport), yet provides an extraordinary flexing resistance, as is needed because of the forces that act on the base when the motorcycle is strapped in place and when the light-weight base is being moved by means such as fork lift trucks.

BRIEF DESCRIPTION OF THE DRAWINGS

Preferred embodiments of the inventive shipping package will now be explained in greater detail with reference to the attached drawings, in which:

FIG. 1 shows a plan view of a first embodiment of the inventive shipping container with a roll-in and roll-out ramp for a motorcycle mounted thereto.

FIG. 2 shows a side view of the embodiment shown in FIG. 1;

FIG. 3 shows a front view (in the direction in which a motorcycle would be introduced into the container) of the shipping container;

FIG. 4 shows a rear view of the shipping container;

FIG. 9a shows a partly broken away perspective view of a second embodiment of the inventive shipping container comprising clamping means in the form of a spring assembly;

FIG. 11 is a detail perspective view of a portion of the container of FIG. 9a and 9b showing a first embodiment of a clamping assembly;

FIG. 12 is a view similar to FIG. 11, but showing a second embodiment of the clamping assembly;

FIG. 13 shows a view similar to FIG. 11, but showing a third embodiment of the clamping assembly;

DETAILED DESCRIPTION OF THE INVENTION

Figure 5:
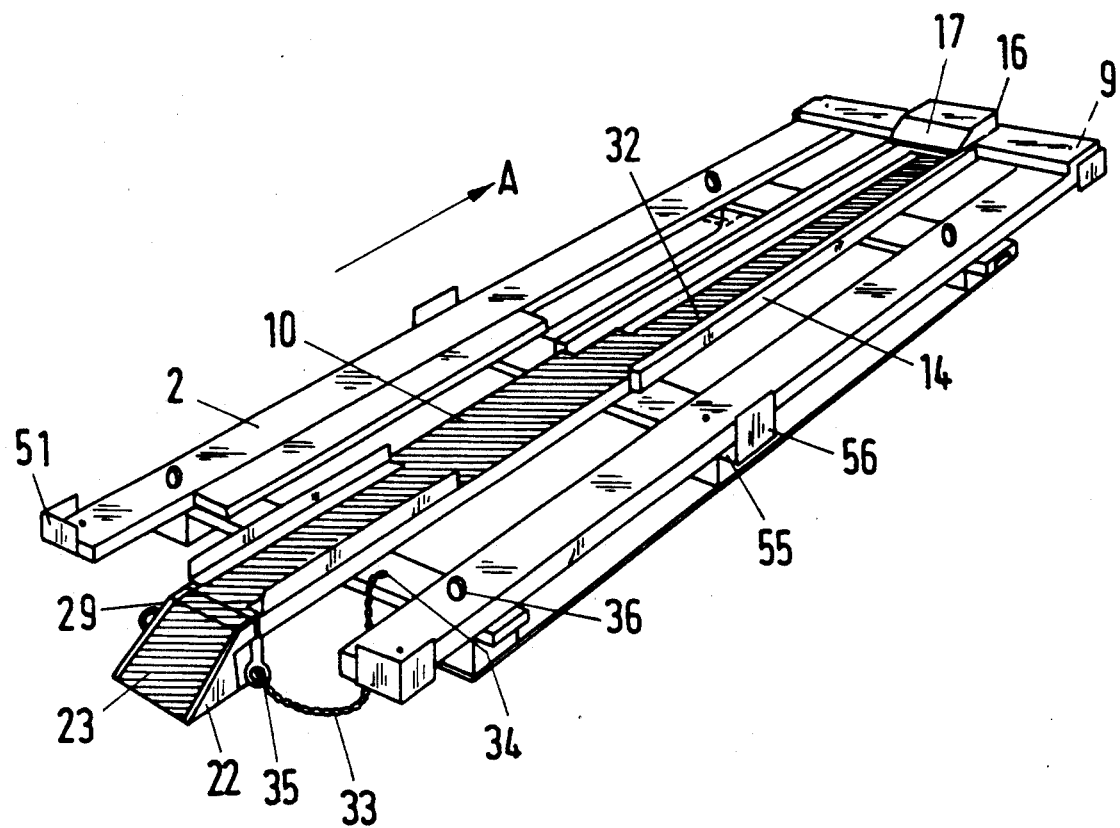
FIG. 5 shows a perspective view of the embodiment of FIG. 1.

FIGS. 1 to 4 show a first embodiment of the shipping container for ready-to-use motorcycles comprising a frame-like base 1 having two longitudinal runners 2 secured on three stringers 3a to 3c mounted transversely thereon. Relative to the direction in which a motorcycle (4) is to be introduced into the container (i.e. the longitudinal direction as shown by arrow A in FIG. 5), a first transverse stringer 3a is located in a front portion, a second transverse stringer 3b is located in a center portion and a third transverse stringer 3c is located in a rear portion of the longitudinal runners 2 (see FIGS. 1 and 2). As shown in FIG. 2, the frame-like base 1 is supported by an underframe 5, itself comprising two stringers 6 longitudinally extending below runners 2 and connected with transverse stringers 3a, 3b, 3c of base 1 via intermediate members 7. Underframe 5 is shorter in length at each end thereof than the base 1 by predetermined equal distances. Preferably, base 1 has a length of 232 cm and underframe 5, has a maximum length of 214 cm, with each end of the underframe 5 being spaced from the corresponding end of the base 1 by an equal distance (i.e. 9 cm). The combination of frame-like base 1 and of underframe 5 creates a grid-shaped support structure which resists the flexing forces caused by lashing the motorcycle in place, such that a motorcycle can be stored safely. The distance between longitudinal runners 2 and the associated longitudinal stringers 6 of underframe 5 is at least 6 cm. At the front ends 8 of the longitudinal runners 2, a transverse bottom tie 9 made of wood is secured thereto. Along the longitudinal centerline of the base 1, there is provided a rolling base or floor 10 secured to supports 11 provided on the transverse stringers 3 of base 1. The top surface of rolling floor 10 lies below the plane of the bottom surface of tie 9. Along the longitudinal centerline of rolling floor 10, there is provided a lateral guide structure 12, including track limiting elements 14, for front wheel 13 of motorcycle 4, said structure 12 extending rearwardly from the front end of floor 10 to the second transverse stringer 3b. The lateral track limiting elements 14 of said guide structure 12 are secured to the rolling floor 10. The front end faces 15 of track limiting elements 14 abut tie 9. As shown in FIG. 2, tie 9 has thereon a wedge member 16 extending transversely of track limiting elements 14 across the width of the rolling floor 10. The wedge member 16 has an inclined surface 17 facing in a direction opposite the motorcycle introduction direction A to engage front wheel 13 of motorcycle 4. As shown in FIG. 5, the front portion of rolling floor 10 is lowered (i.e. has a stepped down portion) so as to more efficiently utilize the height of the shipping container. This is important because motorcycle windshields are relatively high and the height of cargo holds and their doors on aircraft is limited. In rear portions of the rolling floor 10, there is provided along the longitudinal centerline thereof lateral guide structure 18 for the rear wheel 19 of the motorcycle 4, with track limiting elements thereof being defined by two metal angle bars 20 secured on rolling floor 10 (see FIGS. 4 and 5). The rear end faces 21 of the bars 20 (relative to the forward direction A) lie in the plane of a rear end face 22 of the rolling floor 10.

Figure 6:
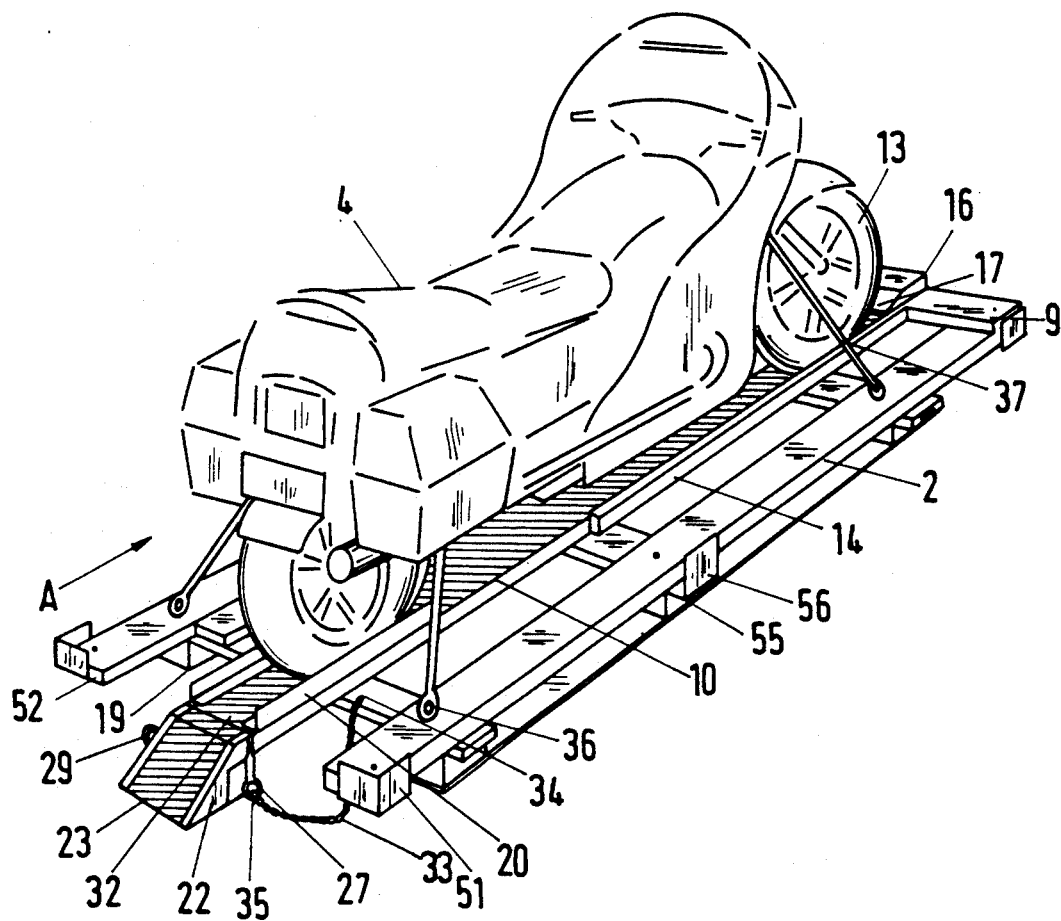
FIG. 6 shows a perspective view of the embodiment of FIG. 1 with the roll-in and roll-out ramp and with a motorcycle strapped in place in the container.
Figure 7:
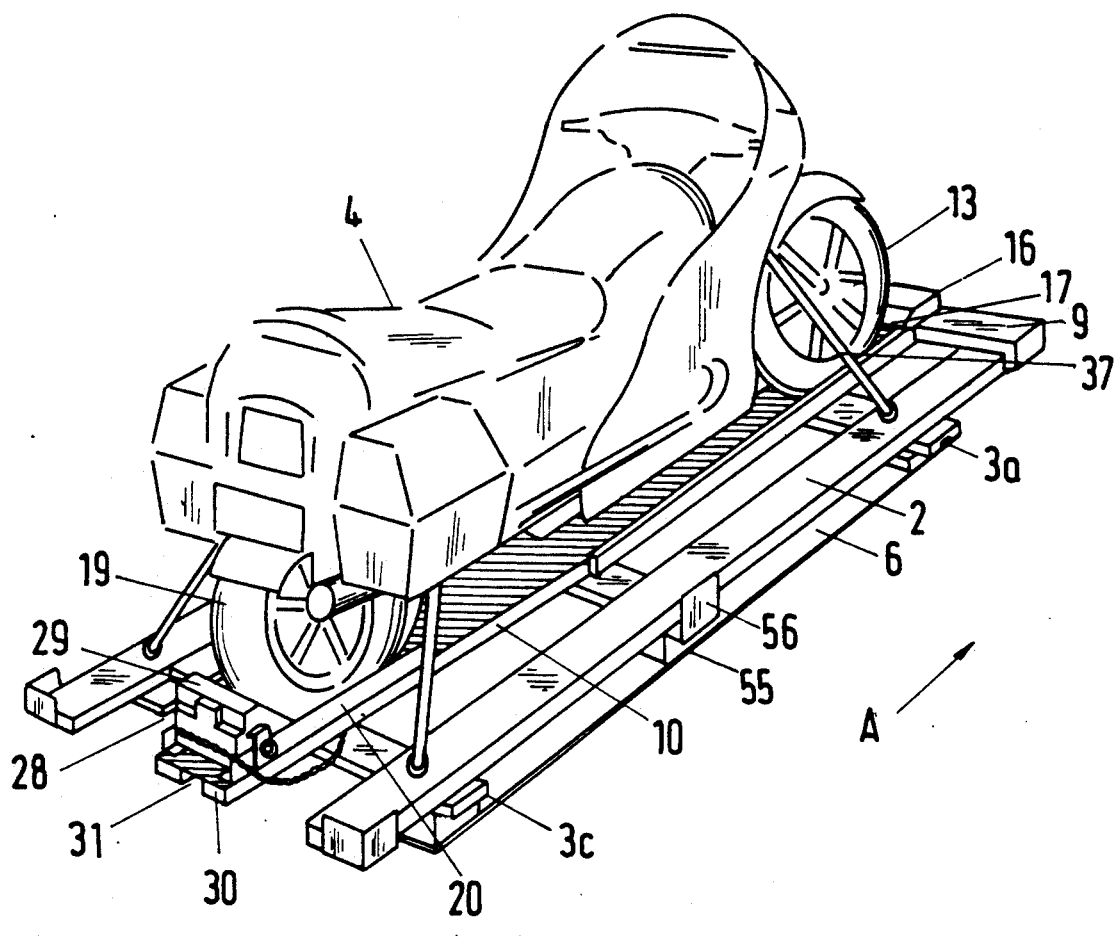
FIG. 7 shows a perspective view corresponding to FIG. 6, with the motorcycle packaged and ready for shipment after the roll-in and roll-out ramp has been removed and with a rear wheel of the motorcycle fixed in position.
Figure 8:
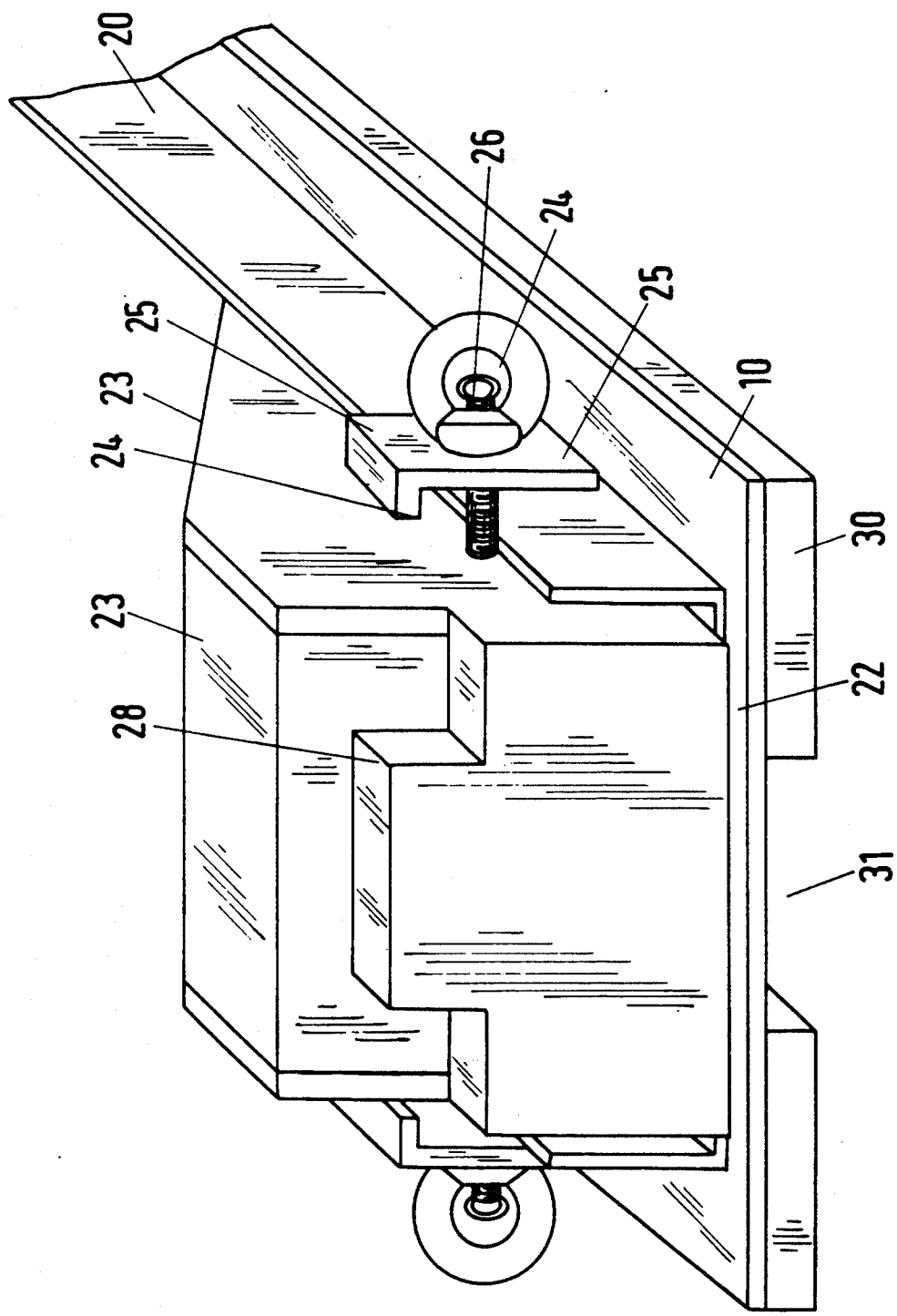
FIG. 8 shows a persecutive view of a wedge element introduced in a lateral guide structure for the rear wheel of the motorcycle and serving to fix that wheel in position, that wedge element being adapted to be used also as a roll-in and roll-out ramp.

FIG. 8 shows a perspective view of a wedge element 22 suited for use as a roll-in or roll-out ramp for the motorcycle 4 (see FIGS. 1, 2, 5 and 6) and for fixing the rear wheel 19 of the motorcycle 4 in place (FIG. 7). The wedge element 22 is adapted to be introduced into the lateral guide structure 18 for rear wheel 19 such that it can be longitudinal displaced with its inclined ramp surface 23 directed in direction A. As a result, different motorcycle models can be longitudinally fixed in position inside the shipping container. The wedge element 22 has an infinitely adjustable clamping means 24 mounted thereto for securing it to the lateral guide structure 18 for rear wheel 19. Clamping means 24 comprises angle members 25 movably disposed on either side of the wedge element 22. Angle members 25 are mounted on an externally threaded rod 26 extending horizontally through the wedge element 22, and captive nuts 27 having eye-shaped heads are provided to clamp the angle members 25 against the metal angle bars 20 of the rear lateral guide structure 23. On its side opposite ramp surface 23, the wedge element 22 is recessed to form a collar 29 (including an engagement projection) terminating below top surface 28 of wedge element 22. Where wedge element 22 is used as a roll-in and roll-out ramp for motorcycle 4 with its ramp surface 23 pointing in direction A, the engagement projection of collar 29 is receivable in a recess 31 provided on the rear end face 30 of base 1 so that the difference in heights between top surface 32 of rolling floor 10 and the resting plane of underframe 5 will be bridged, causing top surface 28 of wedge element 22 and top surface 32 of rolling floor 10 to lie in the same plane (see FIGS. 5 and 6). A chain 33 has one end affixed to one of the nuts 27 of clamping means 24 and has its other end secured to the rear transverse stringer 3c so as to secure the wedge element 22 to the base 1 so that the wedge element 22 will not become lost.

Eye members or lugs 36, which are four in number, are captively secured on the longitudinal runners 2 at positions above the opposing ends of each of the first and third transverse stringers 3a, 3c, respectively, to receive straps 37 by means of which the motorcycle 4 can be lashed to the base 1 of the shipping container (FIGS. 6 and 7).

As shown in FIG. 1, the second and third transverse stringers 3b, 3c have secured thereon on the lefthand side (relative to forward direction A) of the longitudinal axis of the base a jack rest board 38 extending in parallel with longitudinal runners 2. An important feature is that all threaded connections provided on frame-like base 1 are captively secured in a manner such that they can be tightened. Suitable straps for lashing the shipping container to standard IATA air cargo pallets may be passed through annular eyes 36.

Figure 9B:
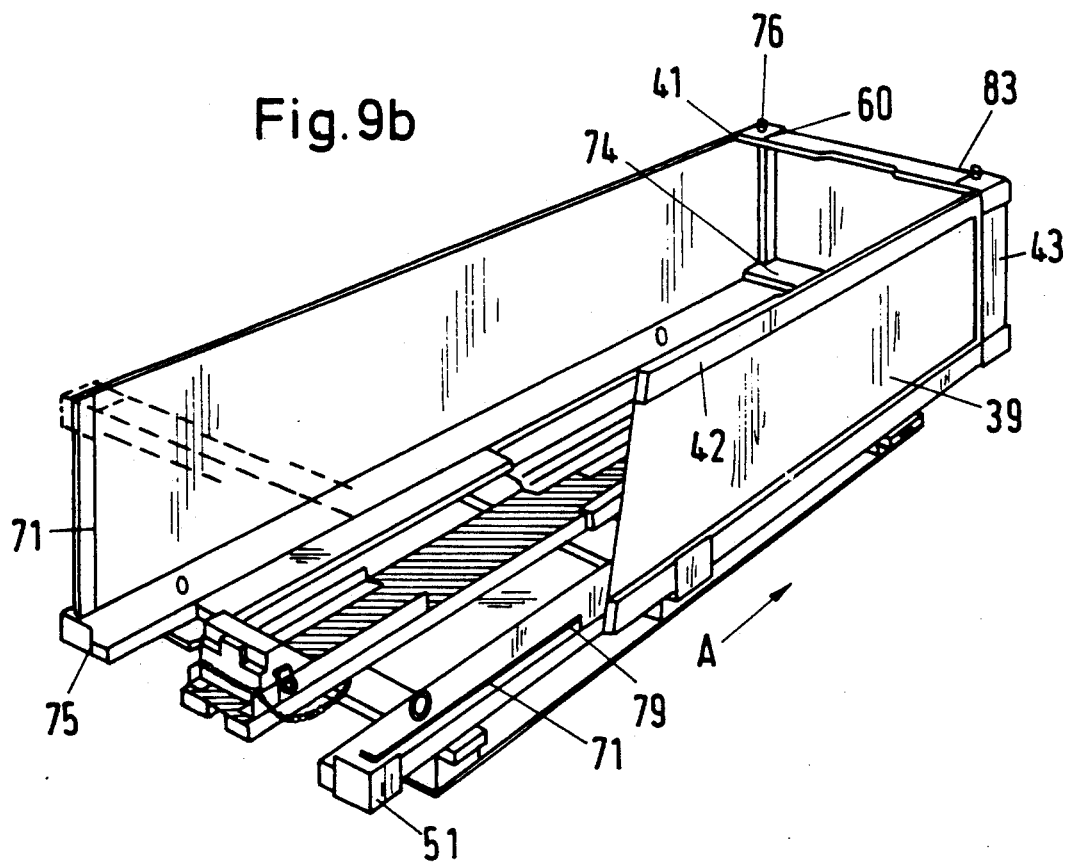
FIG. 9b shows a view corresponding to FIG. 9a, with the clamping means comprising a rod having a threaded portion at the top end thereof.
Figure 15:
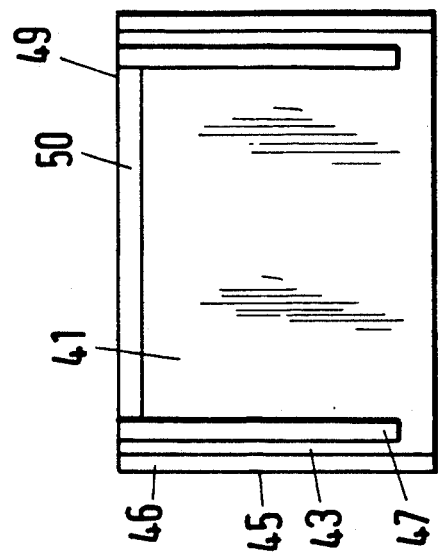
FIG. 15 shows a plan view of a wall panel forming an end face of the box-like enclosure.
Figure 14:
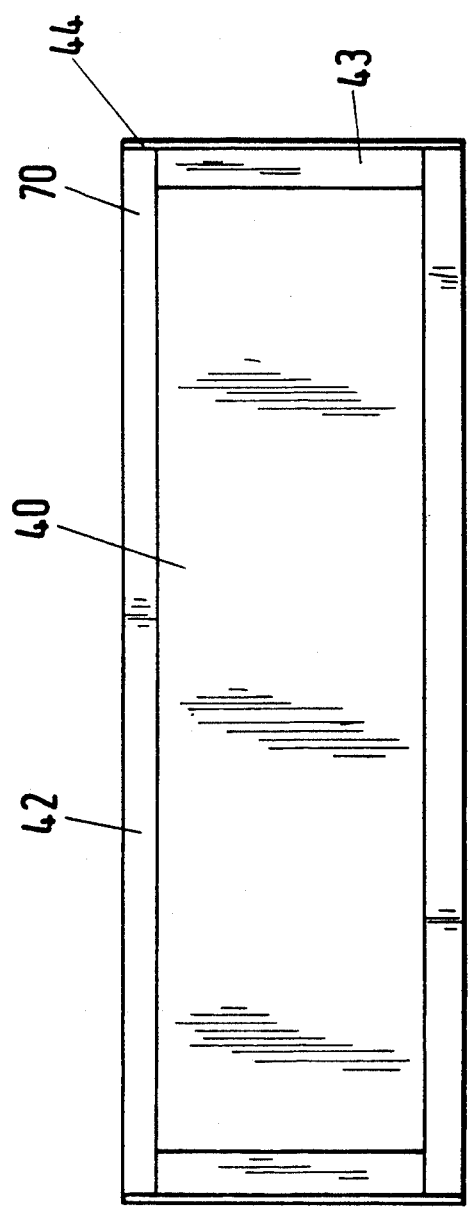
FIG. 14 shows a plan view of a longitudinal wall panel for the box-like enclosure of the second embodiment of the inventive shipping container.

FIGS. 9a and 9b illustrate a second embodiment of the inventive shipping container which includes the basic structure of the first embodiment of the inventive shipping container, and further comprises a box-like enclosure 39 releasably secured to base 1 and having a height such that a plurality of ready-to-ship motorcycles can be placed side by side without running the risk of being damaged. Said box-like enclosure 39 consists of two longitudinally extending wall panels 40, as shown in FIG. 14, and two transversely extending wall panels 41, as shown in FIG. 15, which panels are releasably interconnected.

Each of the two longitudinally extending wall panels 40 has, along its longitudinal edges, reinforcing strips 42 which are connected at their ends by vertical reinforcing strips 43. The longitudinal reinforcing strips 42 extending along the longitudinal wall panels 40 are slightly shorter than the latter so as to leave at the two ends of each wall panel 40 a joining portion 44 extending over the height thereof and having a thickness less than the width of the longitudinally extending vertical reinforcing strips 42 and 43, respectively.

Each transversely extending wall panel 41 of box-like enclosure 39 has along its vertical edges 45 a first vertical reinforcing strip 46, and a second vertical reinforcing strip 47 spaced a distance from strip 46 such that a joining groove 48 is formed for receiving joining portion 44 of one of the longitudinally extending wall panels 40. Along the top transverse edge 49 of the transversely extending wall panel 41 is provided a transverse strip 50 extending between said second vertical reinforcing strips 47. As shown in FIG. 15, said second vertical reinforcing strip is shorter than the first vertical reinforcing strip 46 of transverse wall panel 41 by the height of longitudinal reinforcing strip 42 of longitudinal wall panel 40.

As the four bottom corners of the shipping container, there are sheet steel corners 51 secured to the corners of longitudinal runners 2 to cover portions of end face 52, of external side surface 53 and of bottom surface 54 of the respective longitudinal runner 2. The sheet steel corners also extend upwardly beyond said runners and engage the respective corner portions of the wall panels 40, 41 so as to provide support thereto. Further, there are secured to each longitudinal runner 2, above central transverse stringer 3b, sheet steel angle members 55 of which one leg 56 extends vertically upwards in the plane of the external side surface 53 of the longitudinal runner 2 and engages bottom longitudinal reinforcing strip 42 of longitudinal wall panel 40 of enclosure 39, providing additional support thereto.

Figure 10B:
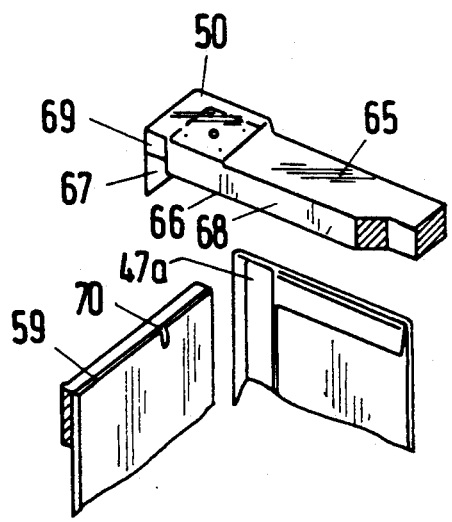
FIG. 10b shows a view corresponding to FIG. 10a, but with modified wall panels of the enclosure.
Figure 10A:
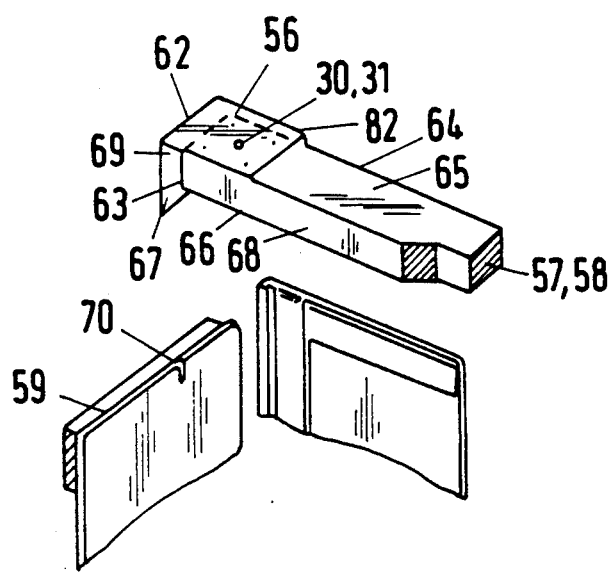
FIG. 10a shows a exploded perspective view of the elements forming one corner of an enclosure of the embodiment of FIGS. 9a and 9b.

As shown in FIGS. 9a and 9b in connection with FIG. 10a, box-like enclosure 39 has, at the front and rear end faces thereof, front and rear top frame beams 57 and 58, respectively, releasably secured to the top edges 59 of wall panels 40, 41, so as to form the top front and rear edges 60 of the box-like enclosure 39. At ends 61 of top frame beams 57, 58, there are secured sheet steel angle members 62 (see FIG. 10a) embracing the corresponding end face 63 and portions of the outer side surface 64 and of top surface 65 of transverse beams 57 and 58. The angle embers 62 also extend downwardly beyond bottom surface 66 of beams 57, 58 and define, together with end faces 63 and outer side surfaces 64 of beams 57, 58, grooves 67. These grooves 67 receive corresponding reinforcing strips 42 and 46 of the corresponding top corners of wall panels 40, 41, thereby forming enclosure 39 when the top frame beams 57 and 59 are joiningly mounted on enclosure 39 in a tongue-and-groove fashion. Further, each sheet steel angle member has a sturdy vertical metal nose 69 bent downwards in the plane of interior side surface 68 of the respective top frame beam 57, 58. Each nose 69 lockably engages a corresponding groove 70 in the top edge 59 of the associated longitudinal wall panel 40 and of the associated longitudinal top reinforcing strip 42. This additional locking engagement provides a rigid interconnection of the wall panels when under diagonal pull and thrust.

FIG. 10b shows an alternative arrangement of wall panels 40, 41 forming said box-like enclosure which differs from the arrangement shown in FIG. 10a in that transverse wall panels 41 have no first vertical reinforcing strip (refer to FIG. 15) and no grooves to receive tongue-like members. Instead, there are provided, on opposing sides of the transverse wall panel 4 in drawn-in locations thereof, vertical reinforcing strips 47a corresponding to second vertical reinforcing strip 47 of FIG. 10a. The corresponding corner of the box-like enclosure is formed simply by abutting the respective longitudinal wall panel 40 against the offset vertical reinforcing strips 47a. With sheet steel angle members 62 provided at respective ends of transverse beams 57, 58, the vertical metal nose 69 on the angle members will engage the associated groove 70 in the corresponding longitudinal wall panel 40, so that the wall panels 40 and 41 will be firmly and stably secured to each other at the respective corners of the box-like enclosure 39.

As clearly shown in FIGS. 9a, 9b and 11 to 13, wall panels 40, 41 are clamped to the base 1 by vertically acting clamping assemblies 71. Seen in the direction A of motorcycle introduction, rear clamping assemblies 71 engage the rear ends of longitudinal runners 2 and the associated ends of rear top beam 58, and front clamping assemblies 71 engage the ends of the transverse tie 9 secured on runners 2 and the corresponding ends of the front top beam 57. The rear clamping assemblies 71 are adjustably secured via eye elements 75, 76 on top surfaces 72 of the runners 2 at rear ends 73 thereof and to the ends 61 of the rear top frame beam 58. The front clamping assemblies 71 are adjustably secured via eye elements 75, 76 on the top surface 74 of tie 9 at the ends thereof and to the ends 61 of the front top frame beam 57.

Figure 16:
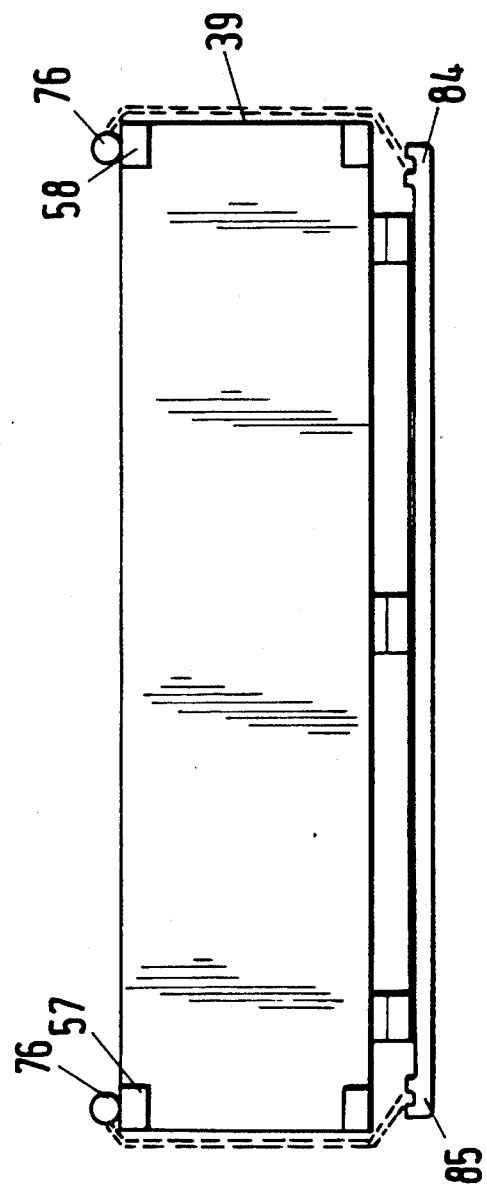
FIG. 16 shows a side view of a cargo pallet in accordance with IATA regulations and the shipping container of the second embodiment lashed thereto.

Preferably, each of the clamping assemblies 71 shown in FIGS. 9b and 11 comprise a clamping rod 77 having at its bottom end a perpendicular, relatively short leg 78 engageable with an associated one of eye members or lugs 75 at the corresponding end of a runner 2. The top end of rod 77 is externally threaded, as shown at 79, and is intended to be introduced through a bore 80 in the corresponding frame beam 57 or 58 and through an aligned bore 81 in the leg 82 of sheet steel angle member 62 placed on top surface 65 of transverse frame beam 57 or 58 to extend upwardly from top frame beam 57 or 58, respectively. External threads 79 on rod 77 threadingly engage, and are tightened against, internal threads in the body of eye member 76 on top transverse frame beam 57 or 58, causing bottom and top sheet steel corner angle members 51, 62 to be firmly clamped together so a to resist flexing. In the disassembled state of the box-like enclosure 39 and thus in the rest condition of clamping assembly 71, the clamping rod 77 may be rotated downwardly to lie flat on the corresponding runner 2 so that it cannot get lost and is out of the way (see FIG. 9b). The releasable eye members 76 on the top transverse frame beams 57, 58 are held thereon by means of chains 83. Eye members 76 on beams 57, 58 may be used to secure additional straps for lashing in the embodiment shown in FIGS. 9a 9b of the inventive shipping container in position in a stowing position or on a standardized IATA air cargo pallet 84 (see FIG. 16). Pallets of this kind have a length of 214 cm. The underframe 5 of the inventive shipping container is drawn in at opposing ends by predetermined equal distances, and therefore permits lashing straps which extend through eye members 76 to be securely guided about the frame-like base 1 to lashing eyes 85 of the air cargo pallet 84. A shipping container having a length of 232 cm can easily be lashed in place on the pallet 84 (see FIG. 16).

FIGS. 9 and 12 show an embodiment of clamping assembly 71 comprising a spring assembly and FIG. 13 shows an embodiment of the clamping assembly 71 in the form of a tensionable chain, said spring and chain appropriately clamping engaging the associated eye members 75 on runners 2 or on tie 9 and the corresponding eye members 76 on top transverse beams 57, 58.

The box-like enclosure 39 extends upwards to a height of not more than 70 cm above the bottom surface of longitudinal stringers 6.

What is claimed is:

1. A shipping container for use in shipping a preassembled motorcycle, comprising:

a base including a pair of spaced apart parallel longitudinally elongated runners, and at least three spaced apart parallel elongated transverse stringers mounted to and beneath said elongated runners and extending transversely thereof, said stringers comprising a front stringer mounted near front ends of said elongated runners, a rear stringer mounted near rear ends of said elongated runners, and a central stringer mounted near central portions of said elongated runners;

a longitudinally elongated rolling floor mounted on said transverse stringers, extending along a lateral centerline of said base, and being adapted to support front and rear wheels of the motorcycle;

a lateral guide structure mounted on said rolling floor for guiding the front and rear wheels of the motorcycle;

an underframe mounted to and beneath said base, and including a pair of elongated longitudinal stringers mounted beneath said transverse stringers and vertically below said elongated runners, respectively, said underframe being shorter than said base and being longitudinally centered therebeneath, so that opposing longitudinal ends of said base extend longitudinally outwardly of said opposing longitudinal ends of said underframe;

a stationary wedge element mounted at a front end of said base and above at least a portion of said lateral guide structure so as to abut the front wheel of the motorcycle when the motorcycle is moved onto said rolling floor;

a movable wedge element having a ramp surface, being adapted to be longitudinally movably mounted on said rolling floor with said ramp surface facing forwardly, and comprising an engagement means for attaching said movable wedge element to said base at a rear end thereof with said ramp surface extending rearwardly and being inclined upwardly and forwardly toward said rolling floor such that said ramp surface bridges a vertical gap between a top surface of said rolling floor and a bottom surface of said underframe;

adjustable clamping means for selectively clamping said movable wedge element in a longitudinal position along said rolling floor; and eye members mounted to said base for receiving straps for lashing the motorcycle in position.

2. A shipping container as recited in claim 1, wherein an engagement recess is formed in said rear end of said base; and said engagement means comprises an engagement projection on a face of said movable wedge element opposite said ramp surface, said engagement projection being receivable in said engagement recess.

3. A shipping container as recited in claim 1, further comprising
intermediate pieces respectively mounted vertically between said transverse stringers and said longitudinal stringers.

4. A shipping container as recited in claim 1, further comprising
supports respectively mounted vertically between said transverse stringers and said rolling floor for supporting said rolling floor.

5. A shipping container as recited in claim 1, wherein
said rolling floor comprises a front portion and a rear portion, and said front portion of said rolling floor is lower than said rear portion of said rolling floor, such that the front wheel of the motorcycle will be lower than the rear wheel thereof when the motorcycle is supported on said rolling floor.

6. A shipping container as recited in claim 1, further comprising
an elongated tie member mounted on and extending transversely between said longitudinally elongated runners; and
wherein said stationary wedge elements is fixed on said elongated tie member.

7. A shipping container as recited in claim 6, wherein
said lateral guide structure includes a front guide structure having a pair of transversely spaced apart track limiting members mounted on a front portion of said rolling floor, with front ends of said track limiting members being in abutment with said elongated tie member; and
a top surface of said rolling floor is spaced downwardly of a bottom surface of said elongated tie member.

8. A shipping container as recited in claim 1, further comprising
an elongated rest board mounted on said central and rear transverse stringers and in parallel with said longitudinally elongated runners.

9. A shipping container as recited in claim 1, further comprising
fastening means for fastening said movable wedge element to said base while allowing said wedge element to be moved between a position in which it is mounted on said rolling floor and a position in which said ramp surface is inclined upwardly and forwardly toward said rolling floor.

10. A shipping container as recited in claim 9, wherein
said fastening means comprises a chain.

11. A shipping container as recited in claim 1, wherein
said longitudinal stringers are respectively spaced at least 6 cm below said elongated runners.

12. A shipping container as recited in claim 1, wherein
said eye members comprise four eye members respectively mounted to said longitudinally elongated runners above opposing ends of said front and rear transverse stringers; and
fastening means are provided for retaining said eye members with said elongated runners, respectively, even when said eye members are removed from their operative positions.

13. A shipping container as recited in claim 1, wherein
said base has a length of 232 cm and said underframe has a length of 214 cm.

14. A shipping container as recited in claim 1, wherein
said lateral guide structure includes a rear guide structure having a pair of transversely spaced apart track limiting elements, each of which comprises a metal angle bar fixed to a rear portion of said rolling floor.

15. A shipping container as recited in claim 14, wherein
said adjustable clamping means comprises an externally threaded rod extending horizontally through said movable wedge element, and a pair of angle segments threaded on opposing ends of said rod to be tightened into engagement with said metal angle bars of said rear guide structure, respectively.

16. A shipping container as recited in claim 15, wherein
said adjustable clamping means further comprises a pair of eye nuts, threadable on said rod, for tightening said angle segments onto said rod, and fastening means for retaining said eye nuts even when said eye nuts are not threaded onto said rod.

17. A shipping container as recited in claim 1, further comprising
an elongated box-like enclosure comprising front, rear, and side wall panels releasably joined to one another by tongue-and-groove connections, a front top transverse frame beam secured by tongue-and-groove connections to a front end of said box-like enclosure atop said front and side wall panels, and a rear top transverse frame beam secured by tongue-and-groove connections to a rear end of said box-like enclosure atop said rear and side wall panels;
retainer brackets for mounting said front, rear, and side wall panels to said base; and
clamping assemblies for releasably clamping said front, rear, and side wall panels to said base.

18. A shipping container as recited in claim 17, further comprising
an elongated tie member mounted on and extending transversely between said longitudinally elongated runners;
wherein at least one of said clamping assemblies includes a component which is movable between a vertical position in which it engages between said front top transverse frame beam and said tie member, and a rest position;
wherein at least another of said clamping assemblies includes a component which is movable between a vertical position in which it engages between said rear top transverse frame beam and one of said longitudinally elongated runners, and a rest position; and
fastening means for fastening said components of said clamping assemblies, when in their rest positions, to a respective one of said longitudinally elongated runners, said rear top transverse frame beam, said front top transverse frame beam, and said tie member.

19. A shipping container as recited in claim 18, wherein
said retainer brackets comprise sheet steel corner members which respectively engage end faces, external surfaces, and bottom surfaces of said elongated runners, and which extend upwardly and engage respective ones of said front, rear, and side wall panels.

20. A shipping container as recited in claim 19, wherein
    said retainer brackets further comprises sheet steel angle members, each of which has a first leg secured to one of said longitudinally elongated runners and a second leg extending upwardly from said first leg and being secured to one of said said wall panels.

21. A shipping container as recited in claim 18, wherein
    each of said tongue-and-groove connections connecting said rear top transverse frame beam to said rear and side wall panels comprise a sheet steel angle member having a first leg which engages with said rear top transverse frame beam, a second leg which extends downwardly from said first leg to below a bottom surface of said rear top transverse frame beam and engages a respective side wall panel, and a vertical nose extending downwardly from said first leg;
    a nose engagement groove is formed in each of said side wall panels; and
    said vertical nose of each of said sheet steel angle members is engageable in a respective one of said nose engagement grooves.

22. A shipping container as recited in claim 21, further comprising
    additional eye embers releasably fixed to opposing ends of said tie member, and to opposing ends of said rear top transverse frame beam; and
    fastening means for retaining said additional eye members with said rear top transverse frame beam and said tie member, respectively, even when said additional eye members are not fixed to said rear top transverse frame beam and said tie member; respectively.

23. A shipping container as recited in claim 22, wherein
    said fastening means comprises a plurality of chains.

24. A shipping container as recited in claim 22, wherein
    said clamping assemblies comprise a pair of rear clamping assemblies, each of which includes a connecting rod having at its lower end a leg extending perpendicularly therefrom and through said additional eye members which are fixed to said tie member, said connecting rod having at a top end thereof external threads adapted to engage in a bore formed through said rear top transverse frame beam and through a bore formed through a corresponding one of said sheet steel corner elements, said rods being rotatable between a vertical position and a substantially horizontal rest position.

25. A shipping container as recited in claim 22, wherein
    said clamping assemblies comprise a pair of rear clamping assemblies, each of which includes a spring extending between one of said additional eye members fixed to said front ends of said elongated runners and one of said additional eye members fixed to said rear top transverse frame beam.

26. A shipping container as recited in claim 22, wherein
    said clamping assemblies comprise a pair of rear clamping assemblies, each of which includes a chain extending between one of said additional eye members fixed to said front ends of said elongated runners and one of said additional eye members fixed to said rear top transverse frame beam.

27. A shipping container as recited in claim 18, wherein
    each of said tongue-and-groove connections connecting said front top transverse frame beam to said front and side wall panels comprise a sheet steel angle member having a first leg which engages with said front top transverse frame beam, a second leg which extends downwardly from said first leg to below a bottom surface of said front top transverse frame beam and engages a respective side wall panel, and a vertical nose extending downwardly from said first leg;
    a nose engagement groove is formed in each of said side wall panels; and
    said vertical nose of each of said sheet steel angle members is engageable in one of said nose engagement grooves.

28. A shipping container as recited in claim 27, further comprising
    additional eye embers releasably fixed to front ends of said longitudinally elongated runners, and to opposing ends of said front top transverse frame beam; and
    fastening means for retaining said additional eye members with said front top transverse frame beam and said elongated runners, respectively, even when said additional eye members are not fixed to said front top transverse frame beam and said elongated runners, respectively.

29. A shipping container as recited in claim 28, wherein
    said clamping assemblies comprise a pair of front clamping assemblies, each of which includes a connecting rod having at its lower end a leg extending perpendicularly therefrom and through said additional eye members which are fixed to said front ends of said elongated runners, respectively, said connecting rod having at a top end thereof external threads adapted to engage in a bore formed through said front top transverse frame beam and through a bore formed through a corresponding one of said sheet steel corner elements, said rods being rotatable between a vertical position and a substantially horizontal rest position.

30. A shipping container as recited in claim 28, wherein
    said fastening means comprises a plurality of chains.

31. A shipping container as recited in claim 28, wherein
    said clamping assemblies comprise a pair of front clamping assemblies, each of which includes a spring extending between one of said additional eye members fixed to said tie member and one of said additional eye members fixed to said front top transverse frame beam.

32. A shipping container as recited in claim 28, wherein
    said clamping assemblies comprise a pair of front clamping assemblies, each of which includes a chain extending between one of said additional eye members fixed to said tie member and one of said additional eye members fixed to said front top transverse frame beam.

33. A shipping container as recited in claim 17, wherein
    said box-like enclosure extends upwardly from said base to a height approximately 70 cm above bottom surfaces of said longitudinal stringers.

34. A shipping container as recited in claim 17, wherein
    said box-like enclosure further includes a top cover mounted to said front, rear and side wall panels.

* * * * *